United States Patent [19]
Corsette

[11] Patent Number: 4,793,522
[45] Date of Patent: Dec. 27, 1988

[54] POSITIVE DISCHARGE VALVE FOR VISCOUS PRODUCT DISPENSER

[75] Inventor: Douglas F. Corsette, Los Angeles, Calif.

[73] Assignee: Calmar, Inc., Watchung, N.J.

[21] Appl. No.: 61,777

[22] Filed: Jun. 15, 1987

[51] Int. Cl.[4] ........................ B65D 37/00; G01F 11/00

[52] U.S. Cl. ........................ 222/257; 222/320; 222/340; 222/387

[58] Field of Search ............... 222/207, 209, 212, 256, 222/257, 259, 260, 320, 321, 378–381, 383, 385, 386, 402.12, 339–341

[56] References Cited

U.S. PATENT DOCUMENTS

| | | | |
|---|---|---|---|
| 3,257,961 | 6/1966 | Schlenker | 222/321 X |
| 3,268,123 | 8/1966 | Spatz | 222/559 X |
| 3,414,169 | 12/1968 | Corsette | 222/321 |
| 3,640,470 | 2/1972 | Susuki et al. | 222/321 X |
| 3,940,070 | 2/1976 | Boris | 222/385 X |
| 4,511,068 | 4/1985 | Bossina | 222/257 |
| 4,629,097 | 12/1986 | Moore | 222/386 X |
| 4,684,043 | 8/1987 | Foster et al. | 222/257 X |
| 4,691,847 | 9/1987 | Ford et al. | 222/259 |

*Primary Examiner*—Kevin P. Shaver
*Attorney, Agent, or Firm*—Watson, Cole, Grindle & Watson

[57] ABSTRACT

A viscous product dispenser has a positive discharge valve which is opened upon a lost motion arrangement between the spout and the pump piston at the initial actuation of the spout. The lost motion is effected by spaced apart stops on these two members permitting limited sliding movement relative to the pump piston for opening the discharge valve before the pumping movement of the piston. A piston return spring is external to the pump chamber for biasing the discharge valve to a closed position.

A stop ring on the piston head may be provided for bearing engagement with an end wall of the container on which the container is mounted for isolating the load on the piston.

3 Claims, 1 Drawing Sheet

POSITIVE DISCHARGE VALVE FOR VISCOUS PRODUCT DISPENSER

BACKGROUND OF THE INVENTION

This invention relates to pump dispensers, particularly for viscous products such as toothpaste and the like, and more especially relates to a positive discharge valve for the dispenser.

U.S Pat. No. 4,629,097 discloses a viscous product pump dispenser having a discharge spout in communication with a hollow piston stem which therewith defines an unvalved discharge passage.

When filling the dispenser product is loaded to fill the discharge passage as much as possible. Thus the loaded dispenser may be shipped fully primed. Otherwise, if the discharge passage is partially filled, it becomes necessary to assist the priming action by pressing inwardly on the lower piston follower normally provided for such dispensers.

However, a filled discharge passage, even partially, presents a number of problems. During storge, the product in the spout can dry out or lose its flavor. Otherwise, product could unintentionally ooze from the spout if the dispenser is dropped or exposed to adverse ambient conditions. Still further, voids or bubbles in the product could affect pump priming during use.

Another pump dispenser for viscous products is disclosed in U.S. Pat. No. 4,511,068 having a one-way flap valve located in the discharge passage such that downward movement of the piston causes the exerted pressure to be transmitted to the viscous product contained within the container to thereby open the valve. Similar problems are encountered as in the aforedescribed valveless discharge dispenser in that upon filling the dispenser under pressure·the product could easily open the flap valve and enter the spout where it is exposed to air and could become dried or caked or could ooze out of the spout or be inadvertently extruded if the dispenser is dropped in any attitude. Messy conditions are therefore encountered with the use of these dispensers.

SUMMARY OF THE INVENTION

It is therefore an object of the present invention to provide a positive discharge valve for viscous product dispensers of simple construction, easy to operate and economical to produce while avoiding the problems of known dispensers of this general type.

The positive discharge valve of the present dispenser is connected to the movable spout for movement therewith upon actuation, the valve bearing against the piston in a valve closing position under the bias of a return spring associated with the spout. The valve therefore acts as a link to return the pump piston to its initial position under the action of the spring. And, the spout and piston are interengaged for relative movement of the valve upon initial actuation of the spout for thereby opening the discharge valve. Upon continued actuation of the spout with the discharge valve open, the piston is inwardly stroked forcing product into the discharge passage to effect positive priming. When primed, product is discharged through the spout upon piston actuation.

The aforedescribed problems experienced during use of the known dispensers are essentially avoided with the present dispenser. When filled, product is not loaded above the closed discharge valve and cannot force the valve open. Thus product does not enter the spout, and will not dry or cake or inadvertently extrude from the spout if the dispenser is dropped. Thus, medium or lighter viscosity products can be stored and dispensed. And, because of the positive valving and upper pump piston action, the dispenser can be shipped unprimed, i.e., with no product in the spout. Thus, it is not necessary to assist the priming action by pressing inwardly on the lower piston assembly since the poppet valve action facilitates self priming and/or repriming when encountering a bubble or void in the product.

Other objects, advantages and novel features will become more apparent from the following detailed description of the invention when taken in conjunction with the accompanying drawings.

DETAILED DESCRIPTION OF THE INVENTION

Figure 1:
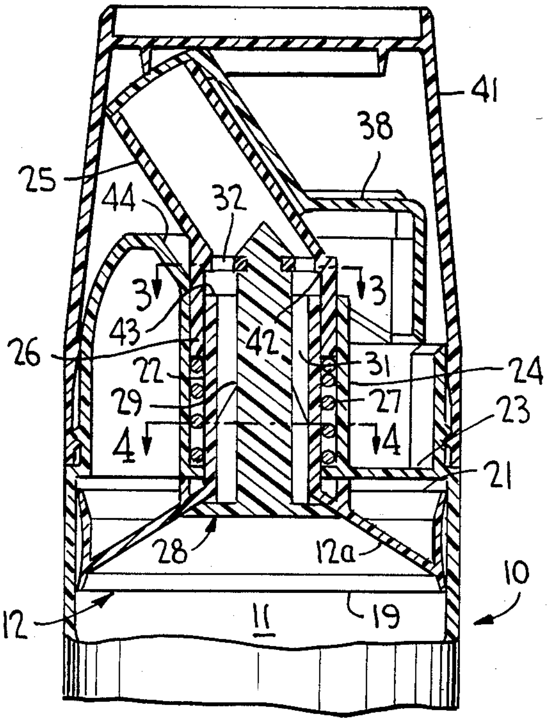
FIG. 1 is a longitudinal, vertical cross-sectional view of a dispenser structured in accordance with the invention showing an overcap in place and the positive discharge valve closed.
Figure 2:
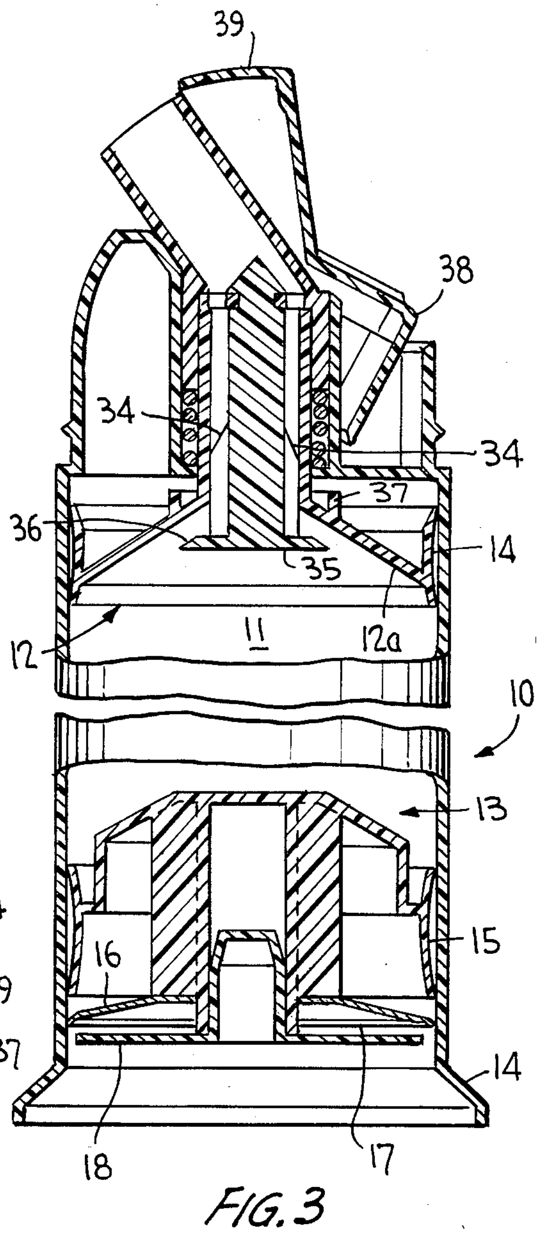
FIG. 2 is a view similar to FIG. 1 showing the lower follower piston assembly, the overcap removed and the positive discharge valve opened upon actuation of the spout and remaining open during pumping movement.

The pump dispenser of FIGS. 1 and 2 is similarly constructed as in U.S. Pat. No. 4,629,097 in that it has a long, tubular, normally upright body 10 defining an internal pumping chamber 11 between an upper pump piston 2 and a lower follower piston 13. The lower end of body 10 may have an outwardly flaring skirt 14 to facilitate standing the dispenser in an upright condition on a support surface. Follower piston 13 is of known construction designed to upwardly move through chamber 11 as the contents thereof become progresively depleted during pumping. The follower piston has an outer peripheral skirt 15 in sealing engagement with the inner surface of body 10. This piston is adapted for upward movement by the provision of a one-way, anti-retrograde means 16 which may be in the form of a downwardly and outwardly flaring thin metal skirt 17 or the like which makes biting engagement with the internal surface of body 10. The angle of attack of metal skirt 17 with the internal body surface is that skirt 17 will flex downwardly a sufficient extent to permit upward movement of the follower piston yet dig into the body surface with sufficient force when downward movement is applied to the top of piston 13 so as to prevent downward movement thereof within body 10. A cover 18 may be friction fitted to the lower end of the piston follower overlying means 16 as shown.

Piston 12 has a piston head 12*a* with a peripheral seal skirt 19, 21 which wipe along the inner surface of body 10 during piston reciprocation. A hollow piston stem 22 extends through a central opening in a transverse upper wall 23 of the body, and is surrounded by a spaced cylinder 24 of the body. A tubular discharge spout 25 has a depending sleeve 26 located for telescoping sliding movement between stem 22 and cylinder 24. A coil spring 27 is likewise located in the space between stem 22 and cylinder 24 and acts between wall 23 and the lower end of sleeve 26 for spring biasing the spout outwardly.

Figure 4:
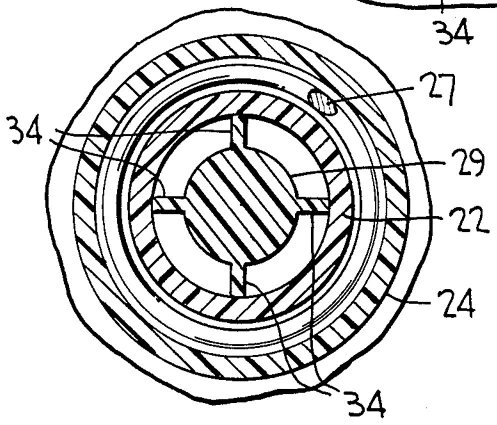
FIGS. 3 and 4 are cross-sectional views taken substantially along the lines 3—3 and 4—4, respectively, of FIG. 1.
Figure 3:
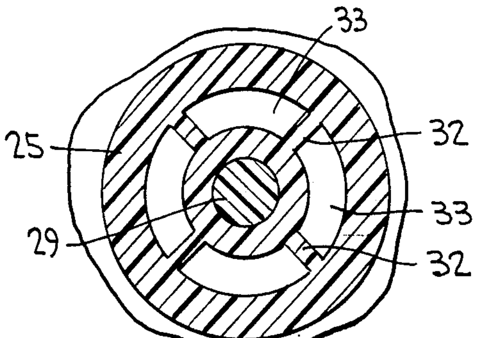

A positive discharge valve 28, which may be in the form of a poppet valve having a central valve stem 29, extends through the piston stem and is of a smaller diameter defining an annular passage 31. The valve stem is connected to the spout for movement together therewith in any normal manner, as for example by a spider 32 (FIG. 3) presenting through openings 33 allowing passage of the viscous product. And, the valve stem has a plurality of guide fins 34 (FIG. 4) for maintaining the valve stem centered within the piston stem upon relative movement thereof as will be described in more detail hereinafter. A valve flange 35 at the lower end of the valve stem has an upper edge 36 which matches the shape of the inner surface of piston head 12a. This inner surface is conical as shown in the drawings, although other shapes are suitable without departing from the invention. The valve flange is spaced a suitable distance from spider 32 as a tightly bear against the undersurface of the piston head, as shown in FIG. 1, under the resiliency of spring 27 which upwardly biases both the spout and valve. And, the piston head 12a has a circular ring 37 on its outer surface which bears against the underside of wall 23 in the at rest position of FIG. 1 under the resilency of the spring, (to positively support the valve seat at its prescribed location). The combined stroke including valve action and pumping displacement are thus positively limited by ring 37 which therefore isolates the load on the piston to prevent any piston distortion.

An actuator 38 may be pivotably mounted on the spout for movement into its FIG. 2 position in which its cover 39 uncovers the end of the spout upon manual depression of the actuator with the overcap 41 removed. Otherwise, the actuator may be of a different construction with or without a cover 39, or may be eliminated altogether such that the spout is directly actuated as in U.S. Pat. No. 4,511,068, without departing from the invention.

There is a lost motion between the spout and the pump piston at the initial actuation of the spout. This lost motion is effected by spaced apart stops on these two members permitting limited sliding movement relative to the pump piston for opening the discharge valve before the pumping movement of the piston. Such spaced stops may comprise a shoulder 42 and an upper free edge 43 of the piston stem spaced a predetermined distance therefrom in the at rest position of FIG. 1. The shoulder may be in the form of a continuous integral ring or a plurality of detents in the spout. With the aforedescribed structural arrangement according to the invention, the pump piston is unattached to any member. Its outer ring 37 bears tightly against the underside of wall 23 under the bias of spring 27 which urges the spout outwardly and thereby resiliently urges the connected discharge valve 28 outwardly such that valve flange 35 is drawn tightly against the undersurface of piston head 12a as shown in FIG. 1. The discharge valve thus acts as a link to retract the pump piston during pumping movement.

Figure 1A:
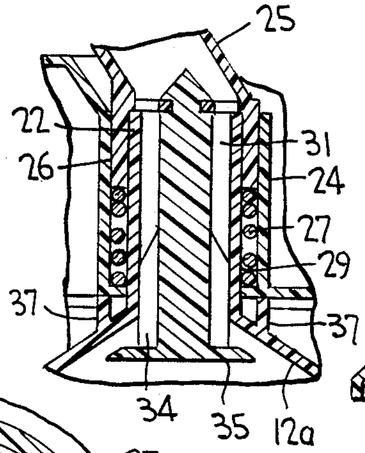
FIG. 1A is a sectional view similar to FIG. 1 of a portion of the dispenser showing the discharge valve open upon initial actuation of the spout.

In operation, with pump chamber 11 filled with viscous product loaded to the underside of the piston head and the valve flange, overcap 41 is removed, and upon initial depressin of actuator 38, there is lost motion between the spout and the piston stem as telescoping sleeve 26 moves relative to piston stem 22 a predetermined distance permitted by the spacing between stops 42 and 43. Since the discharge valve is connected to the spout and moves together therewith, the relative movement causes the discharge valve to open as valve flange 35 moves inwardly relative to the piston head which remains bearing against wall 23, as clearly shown in FIG. 1A. Guide fins 34 maintain the concentricity of valve stem 29 relative to the piston stem so as to assure an even opening and closing of discharge passage 31 around the periphery of the valve flange. As stops 42 and 43 interengage, continued depression of the spout effects pumping movement by inwardly stroking the pump piston as shown in FIG. 2. Inward travel of the piston is limited by stop means such as the lever of actuator 38 bottoming against transverse wall 23 or cylinder 24. A stop shoulder 44 of the pump body may also serve to limit inward travel of the spout which bears thereagainst at the end of the piston stroke, as illustrated in FIG. 2. Upon each release of the actuator or spout (if no actuator is employed), the discharge valve first closes in response to the action of the spring which shifts the spout and its connected valve outwardly until valve flange 35 sets against the piston head for positive prevention of any backflow from the spout while returning the piston to its initial FIG. 1 position. As in known viscous product dispensers having a follower piston such as 13, the follower piston assembly follows the product upwardly during dispensing by the vacuum produced within the body as assisted by atmospheric pressure acting against the outer side of the follower piston.

The piston is actuated as aforedescribed for positively priming the dispenser as discharge passage 31 fills with product. When fully primed, product is dispensed during pumping through the spout which is opened upon uncovering cover 39 if actuator 38 is employed.

Although the present dispenser has been described with reference to actuator 38, the actuator shown may be substituted by some other suitable actuator or may be completely eliminated without departing from the invention. Instead, the spout may be actuated directly by the user and may be provided with a finger rest (not shown) for this purpose.

Obviously, many other modifications and variations of the present invention are made possible in the light of the above teachings. It is therefore to be understood that within the scope of the appended claims the invention may be practiced otherwise than as specifically described.

What is claimed is:

1. A viscous product dispenser comprising, a longitudinally extending, cylindrical container having a pump chamber container for a supply of the viscous product to be dispensed, said container having at one end a follower piston slideable toward an opposite end of said container in response to negative pressure in the chamber after product is dispensed from said chamber, manually actuated means mounted at said other end of said container for dispensing the viscous product upon manual actuation, said dispensing means comprising a longitudinally reciprocable discharge spout having a sleeve, said container having an end wall at said opposite end thereof, said end wall having a longitudinally extending cylinder surrounding said sleeve, a reciprocable pump piston having a piston head operating within said chamber and located inwardly of said end wall, said piston having a hollow stem located within said sleeve and being spaced from said cylinder, an inner end of said sleeve spaced from said end wall, a discharge valve having a valve flange normally seated against the inner surface of said piston head in a valve closed position, said valve having a longitudinally extending stem connected to said spout for reciprocating movement together therewith, said valve stem extending through said piston stem and defining an annular passage therewith in communication with said spout, a return spring extending between said inner end of said sleeve and said end wall within the spacing between said piston stem and said cylinder for biasing said valve flange into said valve closed position, and stop means on said spout spaced from an outer end of said piston stem in said valve closed position, whereby upon depression of said spout said stop means bears against said outer end of said piston stem for initially shifting said discharge valve flange inwardly of said inner surface of said piston head into a valve open position, and for inwardly reciprocating said piston for pumping the viscous product through said annular passage and said spout.

2. The dispenser according to claim 1, wherein said valve stem has guide fins thereon for concentrically guiding said valve stem within said piston stem between said open and closed positions.

3. The dispenser according to claim 1, wherein said piston head has a stop ring on the outer surface thereof in bearing engagement with said end wall for spacing said piston head from said wall in said valve closed position.

* * * * *